(12) United States Patent
Salamon et al.

(10) Patent No.: US 10,120,616 B1
(45) Date of Patent: Nov. 6, 2018

(54) STORAGE MANAGEMENT SYSTEM AND METHOD

(71) Applicant: EMC IP Holding Company, LLC, Hopkinton, MA (US)

(72) Inventors: Victor Salamon, Edmonton (CA); Ying Xie, Edmonton (CA)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 15/492,651

(22) Filed: Apr. 20, 2017

(51) Int. Cl.
*G06F 3/06* (2006.01)
*G06F 13/10* (2006.01)

(52) U.S. Cl.
CPC ............ *G06F 3/0659* (2013.01); *G06F 3/067* (2013.01); *G06F 3/0613* (2013.01); *G06F 3/0683* (2013.01); *G06F 13/102* (2013.01)

(58) Field of Classification Search
CPC .... G06F 3/0683; G06F 3/0659; G06F 3/0613; G06F 3/067
See application file for complete search history.

(56) References Cited

U.S. PATENT DOCUMENTS

| | | | |
|---|---|---|---|
| 9,811,286 B1* | 11/2017 | Shain | G06F 3/0647 |
| 2013/0097377 A1* | 4/2013 | Satoyama | G06F 3/0605 |
| | | | 711/114 |
| 2017/0090776 A1* | 3/2017 | Kowles | G06F 3/0608 |

* cited by examiner

*Primary Examiner* — Glenn A. Auve
(74) *Attorney, Agent, or Firm* — Mark H. Whittenberger; Heath M. Sargeant; Holland & Knight LLP (57) ABSTRACT

A method, computer program product, and computing system for receiving an IO request on a multitier storage system. The multitier storage system includes: a host, a fast storage tier, and at least one slower storage tier. The fast storage tier is coupled to the host using a fast tier network infrastructure and the at least one slower storage tier is coupled to the host using at least one slower tier network infrastructure. The IO request is processed to determine if the IO request is associated with the fast storage tier or the at least one slower storage tier. The IO request is effectuated via one of the fast tier network infrastructure and the at least one slower tier network infrastructure.

21 Claims, 4 Drawing Sheets

STORAGE MANAGEMENT SYSTEM AND METHOD

TECHNICAL FIELD

This disclosure relates to storage systems and methods and, more particularly, to systems and methods for managing multiple data tiers.

BACKGROUND

Storing and safeguarding electronic content is of paramount importance in modern business. Accordingly, various methodologies may be employed to protect such electronic content. One such methodology is to use multiple storage systems that have differing levels of performance. For example, systems that tend to have a lower performance level tend to be less expensive on a per gigabyte level. Conversely, systems that have a higher level of performance tend to be more expensive on a per gigabyte level. Accordingly, users are often required to choose between a more expensive, higher level of performance and a less expensive, lower level of performance.

SUMMARY OF DISCLOSURE

In one implementation, a computer-implemented method is executed on a computing device and includes receiving an IO request on a multitier storage system. The multitier storage system includes: a host, a fast storage tier, and at least one slower storage tier. The fast storage tier is coupled to the host using a fast tier network infrastructure and the at least one slower storage tier is coupled to the host using at least one slower tier network infrastructure. The IO request is processed to determine if the IO request is associated with the fast storage tier or the at least one slower storage tier. The IO request is effectuated via one of the fast tier network infrastructure and the at least one slower tier network infrastructure.

One or more of the following features may be included. The IO request may be a read request and effectuating the IO request may include reading data from either the fast storage tier via the fast tier network infrastructure or the at least one slower storage tier via the at least one slower tier network infrastructure. The IO request may be a write request and effectuating the IO request may include writing data to either the fast storage tier via the fast tier network infrastructure or the at least one slower storage tier via the at least one slower tier network infrastructure. The fast storage tier may be coupled to the at least one slower storage tier using a tier-2-tier network infrastructure. The IO request may be a read request concerning a specific data portion. Whether the specific data portion is in the appropriate storage tier, chosen from the fast storage tier and the at least one slower storage tier, may be determined. If the specific data portion is not in the appropriate storage tier, the specific data portion may be transferred to the appropriate storage tier. Transferring the specific data portion to the appropriate storage tier may include transferring the specific data portion to the appropriate storage tier via the tier-2-tier network In another implementation, a computer program product resides on a computer readable medium and has a plurality of instructions stored on it. When executed by a processor, the instructions cause the processor to perform operations including receiving an IO request on a multitier storage system. The multitier storage system includes: a host, a fast storage tier, and at least one slower storage tier. The fast storage tier is coupled to the host using a fast tier network infrastructure and the at least one slower storage tier is coupled to the host using at least one slower tier network infrastructure. The IO request is processed to determine if the IO request is associated with the fast storage tier or the at least one slower storage tier. The IO request is effectuated via one of the fast tier network infrastructure and the at least one slower tier network infrastructure.

One or more of the following features may be included. The IO request may be a read request and effectuating the IO request may include reading data from either the fast storage tier via the fast tier network infrastructure or the at least one slower storage tier via the at least one slower tier network infrastructure. The IO request may be a write request and effectuating the IO request may include writing data to either the fast storage tier via the fast tier network infrastructure or the at least one slower storage tier via the at least one slower tier network infrastructure. The fast storage tier may be coupled to the at least one slower storage tier using a tier-2-tier network infrastructure. The IO request may be a read request concerning a specific data portion. Whether the specific data portion is in the appropriate storage tier, chosen from the fast storage tier and the at least one slower storage tier, may be determined. If the specific data portion is not in the appropriate storage tier, the specific data portion may be transferred to the appropriate storage tier. Transferring the specific data portion to the appropriate storage tier may include transferring the specific data portion to the appropriate storage tier via the tier-2-tier network In another implementation, a computing system includes a processor and memory is configured to perform operations including receiving an IO request on a multitier storage system. The multitier storage system includes: a host, a fast storage tier, and at least one slower storage tier. The fast storage tier is coupled to the host using a fast tier network infrastructure and the at least one slower storage tier is coupled to the host using at least one slower tier network infrastructure. The IO request is processed to determine if the IO request is associated with the fast storage tier or the at least one slower storage tier. The IO request is effectuated via one of the fast tier network infrastructure and the at least one slower tier network infrastructure.

One or more of the following features may be included. The IO request may be a read request and effectuating the IO request may include reading data from either the fast storage tier via the fast tier network infrastructure or the at least one slower storage tier via the at least one slower tier network infrastructure. The IO request may be a write request and effectuating the IO request may include writing data to either the fast storage tier via the fast tier network infrastructure or the at least one slower storage tier via the at least one slower tier network infrastructure. The fast storage tier may be coupled to the at least one slower storage tier using a tier-2-tier network infrastructure. The IO request may be a read request concerning a specific data portion. Whether the specific data portion is in the appropriate storage tier, chosen from the fast storage tier and the at least one slower storage tier, may be determined. If the specific data portion is not in the appropriate storage tier, the specific data portion may be transferred to the appropriate storage tier. Transferring the specific data portion to the appropriate storage tier may include transferring the specific data portion to the appropriate storage tier via the tier-2-tier network The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
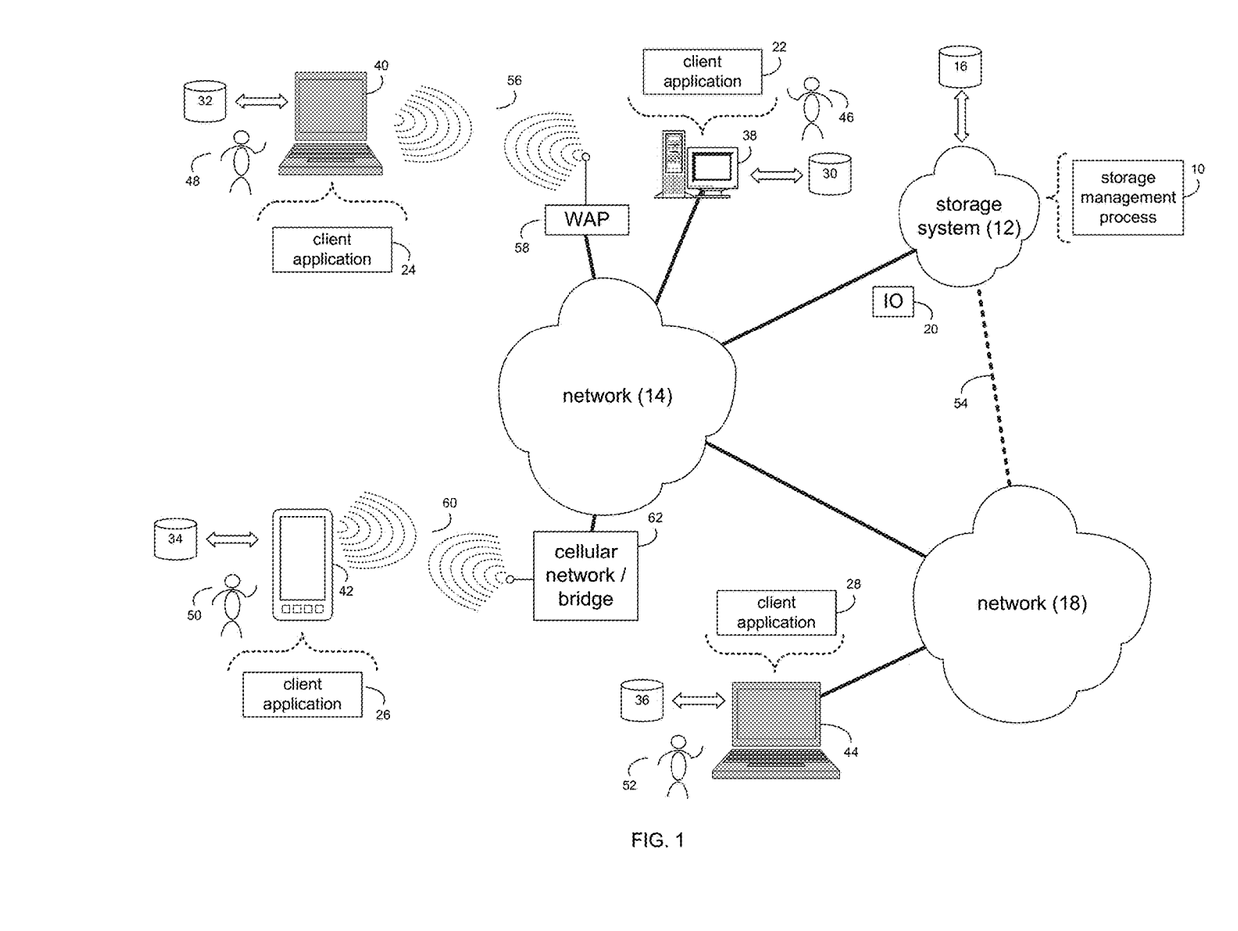
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
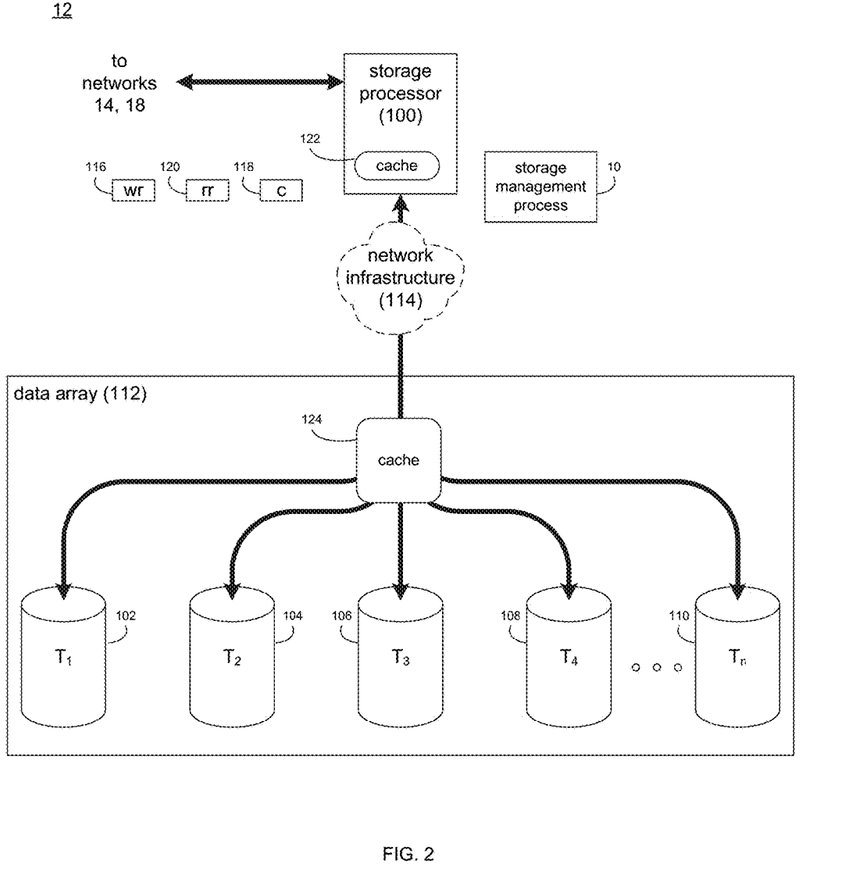
FIG. 2 is a diagrammatic view of another implementation of the storage system of FIG. 1.

Referring also to FIG. 2, there is shown one particular implementation of storage system 12. Storage system 12 may include storage processor 100 and a plurality of storage targets $T_{1-n}$ (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

A Virtualized Environment:

As discussed above, storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

As is known in the art, electro-mechanical hard disk drives (e.g., 15 k, 10 k and 7.2 k hard disk drives) may provide a lower level of performance at a lower price point, while solid-state/flash devices (e.g., SSDs) may provide a higher level of performance at a higher price point.

Figure 3:
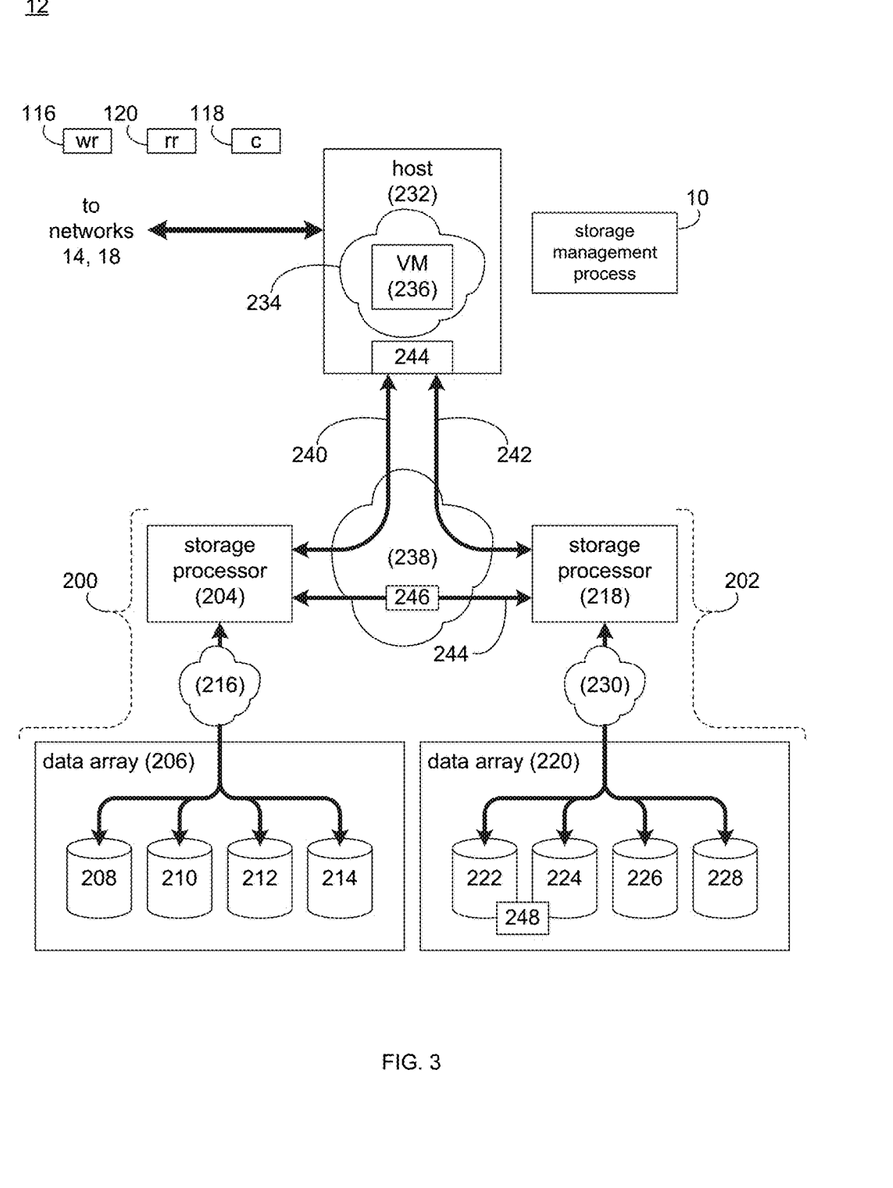
FIG. 3 is a diagrammatic view of another implementation of the storage system of FIG. 1.

Referring also to FIG. 3, there is shown another implementation of storage system 12 that includes two separate and distinct storage subsystems (e.g., subsystems 200, 202). For illustrative purposes only, the first subsystem (e.g., subsystem 200) is shown to include a first storage processor (e.g., storage processor 204) coupled to a first data array (e.g., data array 206) that includes higher-performance/higher-cost SSDs (e.g., SSDs 208, 210, 212, 214), which may be coupled using network infrastructure 216, examples of which may include but are not limited to an Ethernet (e.g., Layer 2 or Layer 3) network, a fiber channel network, an InfiniBand network, or any other circuit switched/packet switched network. An example of subsystem 200 may include but is not limited to an XtremIO™ system available from EMC™ of Hopkinton, Mass.

Further and for illustrative purposes only, the second subsystem (e.g., subsystem 202) is shown to include a second storage processor (e.g., storage processor 218) coupled to a second data array (e.g., data array 220) that includes lower-performance/lower-cost hard disk drives (e.g., storage targets 222, 224, 226, 228), which may be coupled using network infrastructure 230, examples of which may include but are not limited to an Ethernet (e.g., Layer 2 or Layer 3) network, a fiber channel network, an InfiniBand network, or any other circuit switched/packet switched network. An example of subsystem 202 may include but is not limited to a Symmetrix VMax™ system available from EMC™ of Hopkinton, Mass.

While this implementation of storage system 12 is shown to include two subsystems (e.g., subsystem 200 and subsystem 202), this is for illustrative purposes only and is not intended to be a limitation of this disclosure. For example, the number of subsystems may be increased or decreased depending upon the needs of the user and/or design criteria.

Further and while this implementation of storage system 12 is shown to include subsystems (e.g., subsystem 200 and subsystem 202) that each include four storage targets each (e.g., subsystem 200 having storage targets 208, 210, 212, 214; and subsystem 202 having storage targets 222, 224, 226, 228), this is for illustrative purposes only and is not intended to be a limitation of this disclosure. For example, the number of storage targets may be increased or decreased depending upon the needs of the user and/or design criteria.

Storage system 12 may further include host 232 (e.g., a virtualization system/appliance) that may allow for seamless access to one or both of subsystems 200, 202. Specifically, host 232 may execute virtual machine operating environment 234. An example of virtual machine operating environment 234 may include but is not limited to a hypervisor, which is an instantiation of an operating system that may allow for one or more virtual machines (e.g., virtual machine 236) to operate within a single physical device. Accordingly, the combination of host 232, virtual machine operating environment 234, and virtual machine 236 may allow one or more users to access the resources of subsystems 200, 202.

Host 232, subsystem 200 and subsystem 202 may be coupled using network infrastructure 238, examples of which may include but are not limited to an Ethernet (e.g., Layer 2 or Layer 3) network, a fiber channel network, an InfiniBand network, or any other circuit switched/packet switched network. As will be discussed below in greater detail, network connections between host 232 and subsystem 200 may be segregated/separate from network connections between host 232 and subsystem 202.

Figure 4:
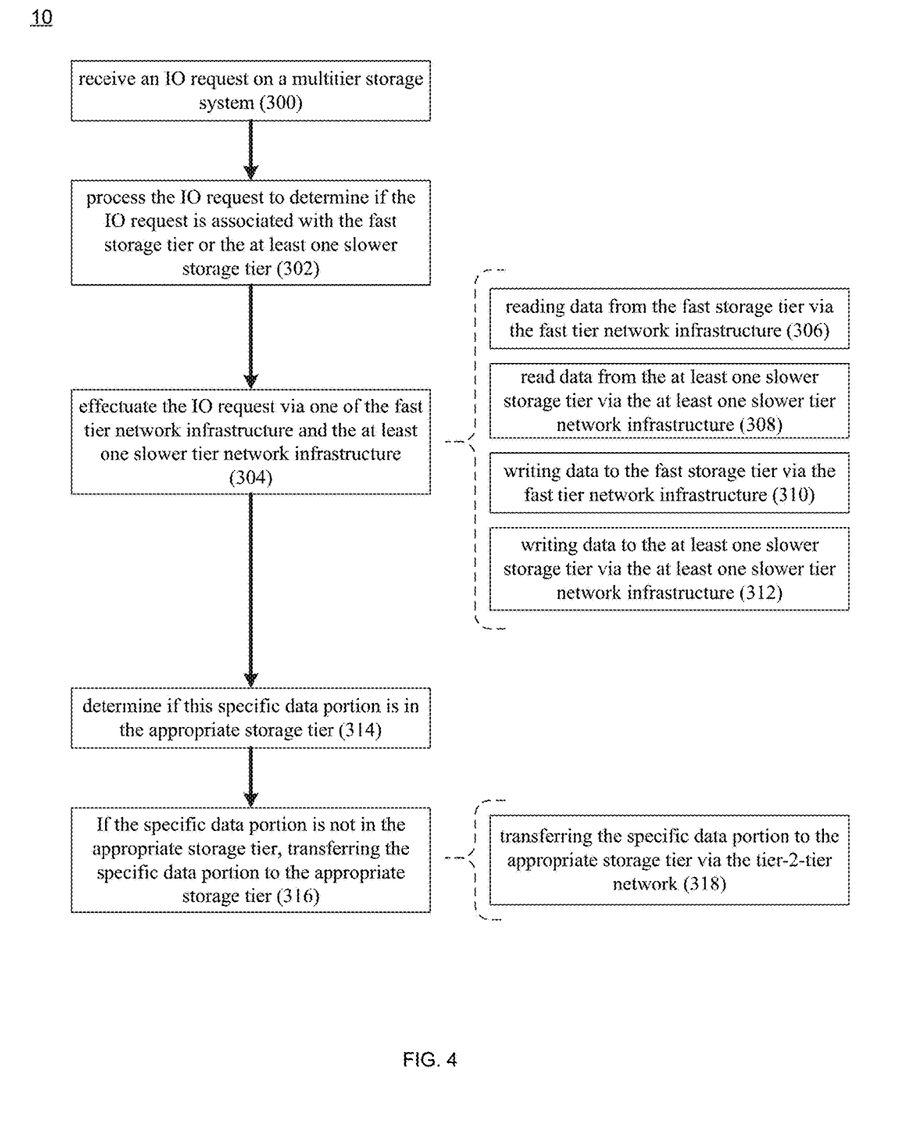
FIG. 4 is a flow chart of the storage management process of FIG. 1.

Storage management process 10 may receive 300 an IO request (e.g., write request 116 or read request 120) on a multitier storage system, examples of which may include but are not limited to the implementation of storage system 12 that is shown in FIG. 3, wherein the multitier storage system may include a host (e.g., host 232), a fast storage tier (e.g., subsystem 200) and at least one slower storage tier (e.g., subsystem 202). The fast storage tier (e.g., subsystem 200) may be coupled to host 232 using a fast tier network infrastructure (e.g., network 240) and the at least one slower storage tier (e.g., subsystem 202) may be coupled to host 232 using at least one slower tier network infrastructure (e.g., network 242).

As discussed above, host 232 may be a virtualization system or virtualization appliance. Accordingly, network 240 and/or network 242 may be virtual networks that are effectuated on one or more physical networks. Specifically, the use of two separate networks (e.g., networks 240, 242) to isolate subsystem 200 and subsystem 202 (respectively) may improve performance of storage system 12 by e.g., isolating workloads and workflows and preventing the workloads/workflows of one subsystem from interfering with the workloads/workflows of the other subsystem. Therefore, in the event that a single physical network has sufficient bandwidth to handle both virtual networks (e.g., network 240 and network 242), that single physical network may be used to effectuate both virtual networks (e.g., network 240 and network 242). However, in the event that a single physical network does not have sufficient bandwidth to handle both virtual networks (e.g., network 240 and network 242), two separate physical networks may be used to effectuate the virtual networks (e.g., network 240 and network 242). Host 232 may include virtual LUN splitter 244 to manage and effectuate the virtual networks (e.g., network 240 and network 242).

Continuing with the above-stated example, storage management process 10 may process 302 the IO request (e.g., write request 116 or read request 120) to determine if the IO request (e.g., write request 116 or read request 120) is associated with the fast storage tier (e.g., subsystem 200) or the at least one slower storage tier (e.g., subsystem 202). As discussed above and in this particular example, the use of two separate networks (e.g., networks 240, 242) isolates subsystem 200 and subsystem 202 to improve performance of storage system 12 by e.g., isolating workloads and workflows. Accordingly, storage management process 10 may effectuate 304 the IO request (e.g., write request 116 or read request 120) via one of the fast tier network infrastructure (e.g., network 240) and the at least one slower tier network infrastructure (e.g., network 242).

Specifically, if the IO request is a read request (e.g., read request 120), effectuating 304 the IO request (e.g., read request 120) may include storage management process 10 reading 306 data from the fast storage tier (e.g., subsystem 200) via the fast tier network infrastructure (e.g., networks 240) if the data portion identified in read request 120 is associated with data blocks within the fast storage tier (e.g., subsystem 200). Alternatively, storage management process 10 may read 308 data from the at least one slower storage tier (e.g., subsystem 202) via the at least one slower tier network infrastructure (e.g., network 242) if the data portion identified in read request 120 is associated with data blocks within the at least one slower storage tier (e.g., subsystem 202).

Further, if the IO request is a write request (e.g., write request 116), effectuating 304 the IO request (e.g., write request 116) may include storage management process 10 writing 310 data to the fast storage tier (e.g., subsystem 200) via the fast tier network infrastructure (e.g., networks 240). Alternatively, storage management process 10 may write 312 data to the at least one slower storage tier (e.g., subsystem 202) via the at least one slower tier network infrastructure (e.g., network 242).

Since these are write requests and the location of the data portion is not already known/determined (as it is with a read request), rules may be applied to specify where these new data portions should be stored. For example, a rule may specify that the data portions associated with a write request (e.g., write request 116) are to be initially stored within the fast storage tier (e.g., subsystem 200) via the fast tier network infrastructure (e.g., networks 240), as the data portion is new and should be considered "hot" data. Alternatively, the rule may specify that the data portions associated with a write request (e.g., write request 116) are to be initially stored within the at least one slower storage tier (e.g., subsystem 202) via the at least one slower tier network infrastructure (e.g., network 242), as the value of the data portion is unknown and should be considered "cold" data.

Further still, the rules may be application specific. For example, the data portions associated with write requests (e.g., write request 116) from a backup program may be initially stored within the at least one slower storage tier (e.g., subsystem 202) via the at least one slower tier network infrastructure (e.g., network 242) since these data portions may be considered to be inherently "cold" data; while the data portions associated with write requests (e.g., write request 116) from a securities trading program may be initially stored within the fast storage tier (e.g., subsystem 200) via the fast tier network infrastructure (e.g., networks 240) since these data portions may be considered to be inherently "hot" data.

To further enhance the efficiency of storage system 12, the fast storage tier (e.g., subsystem 200) may be coupled to the at least one slower storage tier (e.g., subsystem 202) using a tier-2-tier network infrastructure (e.g., network 244), wherein host 232 and/or network infrastructure 238 may include data tier mover 246 to manage and effectuate the transfer of data from one storage tier to another storage tier (as will be discussed below in greater detail).

As discussed above, when write requests (e.g., write request 116) are received, the data portions associated with these write requests may be initially stored (in this example) in one of subsystem 200 and subsystem 202 based upon one or more rules. Further, when read requests (e.g., read request 120) are received, the data portions associated with these read requests may be retrieved from either subsystem 200 or subsystem 202.

As is known in the art, data that is initially "hot" data and highly used may grow "cold" and seldom used for various reasons, including but not limited to e.g., the data no longer being relevant/current and the point in time within the business cycle. Conversely, data that is initially "cold" data and seldom used may grow "hot" and often used for various reasons, including but not limited to e.g., the data becoming relevant/current and the point in time within the business cycle.

As discussed above, when an IO request is received that is a read request (e.g., read request 120), the read request concerns a specific data portion that is already stored on (in this example) one of subsystem 200 and subsystem 202. Accordingly, storage management process 10 may determine 314 if this specific data portion is in the appropriate storage tier, chosen from (in this example) the fast storage tier (e.g., subsystem 200) and the at least one slower storage tier (e.g., subsystem 202).

If the specific data portion is not in the appropriate storage tier, storage management process 10 may transfer 316 the specific data portion to the appropriate storage tier, wherein transferring 316 the specific data portion to the appropriate storage tier may include transferring 318 the specific data portion to the appropriate storage tier via the tier-2-tier network (e.g., network 244)

For example, assume that read request 120 is a read request for data portion 248 that is currently stored within the at least one slower storage tier (e.g., subsystem 202). Accordingly and as discussed above, storage management process 10 may process 302 read request 120 and determine that read request 120 is associated with the at least one slower storage tier (e.g., subsystem 202) due to the location of data portion 248. Accordingly, storage management process 10 may effectuate 304 read request 120 via the at least one slower tier network infrastructure (e.g., network 242) and retrieve data portions 248 and provide this retrieved data portion to the requester.

Storage management process 10 may then determine 314 if data portion 248 is in the appropriate storage tier (e.g., subsystem 200 or subsystem 202). For example, storage management process 10 may determine the number of times that data portion 248 has been accessed within e.g., the last minute, the last hour, the last day or the last week and may compare this result to one or more defined ranges to determine 314 if data portion 248 is in the appropriate storage tier (e.g., subsystem 200 or subsystem 202). For example, if a data portion is accessed more than ten times per hour, that data portion may be considered "hot" data and should be located in the fast storage tier (e.g., subsystem 200). Conversely, if a data portion is accessed ten times or less per hour, that data portion may be considered "cold" data and should be located in the at least one slower storage tier (e.g., subsystem 202).

Accordingly, if storage management process 10 determines that data portion 248 was accessed seven times in the past hour, storage management process 10 may determine 314 that data portion 248 is in the appropriate storage tier (e.g., the at least one slower storage tier, namely subsystem 202). As data portion 248 is currently located within subsystem 202, storage management process 10 may not transfer data portion 248.

However, if storage management process 10 determines that data portion 248 was accessed thirteen times in the past hour, storage management process 10 may determine 314 that data portion 248 is not in the appropriate storage tier (e.g., the fast storage tier, namely subsystem 200). As data portion 248 is currently located within subsystem 202, storage management process 10 may transfer 316 data portion 248 to the appropriate storage tier (e.g., the fast storage tier, namely subsystem 200) from the current storage tier (e.g., the at least one slower storage tier, namely subsystem 202). As discussed above, transferring 316 data portion 248 from subsystem 202 to subsystem 200 may include transferring 318 data portion 248 to the appropriate storage tier (e.g., the fast storage tier, namely subsystem 200) via the tier-2-tier network (e.g., network 244).

As discussed above, host 232 and/or network infrastructure 238 may include data tier mover 246 to manage and effectuate the transfer of data from one storage tier to another storage tier. Accordingly, storage management process 10 may provide the appropriate instructions (e.g., transfer data portion 248 from subsystem 202 to subsystem 200) to data tier mover 246 and data tier mover 246 may effectuate the transfer via the tier-2-tier network (e.g., network 244).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:
1. A computer-implemented method, executed on a computing device, comprising:
    receiving an IO request on a multitier storage system, wherein the multitier storage system includes:
        a host,
        a first storage tier, and
        at least one slower storage tier, wherein the at least one slower storage tier is a slower performance storage tier than the first storage tier,
        wherein the first storage tier is coupled to the host using a first tier network infrastructure and the at least one slower storage tier is coupled to the host using at least one slower tier network infrastructure;

processing the IO request to determine if the IO request is associated with the first storage tier or the at least one slower storage tier; and effectuating the IO request via one of the first tier network infrastructure and the at least one slower tier network infrastructure.

2. The computer-implemented method of claim 1 wherein the IO request is a read request and effectuating the IO request includes:

reading data from either the first storage tier via the first tier network infrastructure or the at least one slower storage tier via the at least one slower tier network infrastructure.

3. The computer-implemented method of claim 1 wherein the IO request is a write request and effectuating the IO request includes:

writing data to either the first storage tier via the first tier network infrastructure or the at least one slower storage tier via the at least one slower tier network infrastructure.

4. The computer-implemented method of claim 1 wherein the first storage tier is coupled to the at least one slower storage tier using a tier-2-tier network infrastructure.

5. The computer-implemented method of claim 4 wherein the IO request is a read request concerning a specific data portion, the computer-implemented method further comprising:

determining if the specific data portion is in an appropriate storage tier, chosen from the first storage tier and the at least one slower storage tier.

6. The computer-implemented method of claim 5 further comprising:

if the specific data portion is not in the appropriate storage tier, transferring the specific data portion to the appropriate storage tier.

7. The computer-implemented method of claim 6 wherein transferring the specific data portion to the appropriate storage tier includes:

transferring the specific data portion to the appropriate storage tier via the tier-2-tier network.

8. A computer program product residing on a non-transitory computer readable medium having a plurality of instructions stored thereon which, when executed by a processor, cause the processor to perform operations comprising:

receiving an IO request on a multitier storage system, wherein the multitier storage system includes:
a host,
a first storage tier, and
at least one slower storage tier, wherein the at least one slower storage tier is a slower performance storage tier than the first storage tier,
wherein the first storage tier is coupled to the host using a first tier network infrastructure and the at least one slower storage tier is coupled to the host using at least one slower tier network infrastructure;

processing the IO request to determine if the IO request is associated with the first storage tier or the at least one slower storage tier; and effectuating the IO request via one of the first tier network infrastructure and the at least one slower tier network infrastructure.

9. The computer program product of claim 8 wherein the IO request is a read request and effectuating the IO request includes:

reading data from either the first storage tier via the first tier network infrastructure or the at least one slower storage tier via the at least one slower tier network infrastructure.

10. The computer program product of claim 8 wherein the IO request is a write request and effectuating the IO request includes:

writing data to either the first storage tier via the first tier network infrastructure or the at least one slower storage tier via the at least one slower tier network infrastructure.

11. The computer program product of claim 8 wherein the first storage tier is coupled to the at least one slower storage tier using a tier-2-tier network infrastructure.

12. The computer program product of claim 11 wherein the IO request is a read request concerning a specific data portion, the computer program product further comprising:

determining if the specific data portion is in an appropriate storage tier, chosen from the first storage tier and the at least one slower storage tier.

13. The computer program product of claim 12 further comprising:

if the specific data portion is not in the appropriate storage tier, transferring the specific data portion to the appropriate storage tier.

14. The computer program product of claim 13 wherein transferring the specific data portion to the appropriate storage tier includes:

transferring the specific data portion to the appropriate storage tier via the tier-2-tier network.

15. A computing system including a processor and memory configured to perform operations comprising:

receiving an IO request on a multitier storage system, wherein the multitier storage system includes:
a host,
a first storage tier, and
at least one slower storage tier, wherein the at least one slower storage tier is a slower performance storage tier than the first storage tier,
wherein the first storage tier is coupled to the host using a first tier network infrastructure and the at least one slower storage tier is coupled to the host using at least one slower tier network infrastructure;

processing the IO request to determine if the IO request is associated with the first storage tier or the at least one slower storage tier; and effectuating the IO request via one of the first tier network infrastructure and the at least one slower tier network infrastructure.

16. The computing system of claim 15 wherein the IO request is a read request and effectuating the IO request includes:

reading data from either the first storage tier via the first tier network infrastructure or the at least one slower storage tier via the at least one slower tier network infrastructure.

17. The computing system of claim 15 wherein the IO request is a write request and effectuating the IO request includes:

writing data to either the first storage tier via the first tier network infrastructure or the at least one slower storage tier via the at least one slower tier network infrastructure.

18. The computing system of claim 15 wherein the first storage tier is coupled to the at least one slower storage tier using a tier-2-tier network infrastructure.

19. The computing system of claim 18 wherein the IO request is a read request concerning a specific data portion, the computer-implemented method further comprising:
    determining if the specific data portion is in the appropriate storage tier, chosen from the first storage tier and the at least one slower storage tier.

20. The computing system of claim 19 further configured to perform operations comprising:
    if the specific data portion is not in the appropriate storage tier, transferring the specific data portion to the appropriate storage tier.

21. The computing system of claim 20 wherein transferring the specific data portion to the appropriate storage tier includes:
    transferring the specific data portion to the appropriate storage tier via the tier-2-tier network.

* * * * *